Dec. 25, 1951 R. C. MOSES 2,580,376
AUDIO SIGNAL MODIFYING APPARATUS
Filed May 9, 1946
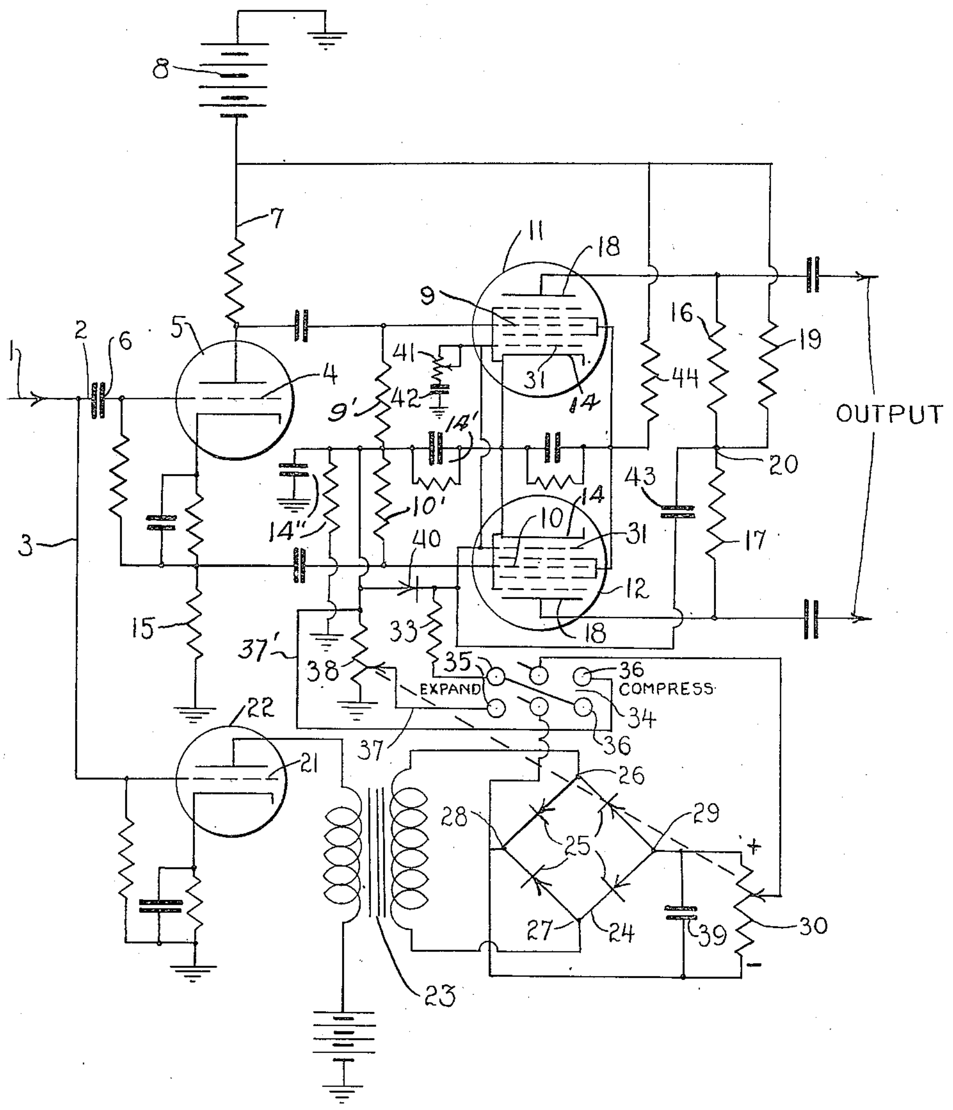
INVENTOR
Robert C. Moses
BY Lawrence Burns
ATTORNEY Patented Dec. 25, 1951 2,580,376

UNITED STATES PATENT OFFICE 2,580,376

AUDIO SIGNAL MODIFYING APPARATUS

Robert C. Moses, Swampscott, Mass., assignor to Sylvania Electric Products Inc., Salem, Mass., a corporation of Massachusetts Application May 9, 1946, Serial No. 668,416

4 Claims. (Cl. 178—44)

This invention relates to apparatus for modifying the output amplitude of audio amplifiers with respect to their input according to a predetermined pattern and particularly to means for expanding or compressing the dynamic range of input signals.

The general object of the invention is to provide means for improving the quality of reproduction in sound producing apparatus.

A further object of the invention is to provide means for accurately superimposing signal amplitude modifying components upon the input signal of an audio amplifier to produce a desired modification thereof.

A further object of the invention is to provide means permitting a substantial increase in the percentage of average modulation of a carrier wave in a radio telephone transmitter without overmodulation at extreme audio peaks.

A further object of the invention is to provide in an audio recording apparatus means to permit a substantial increase in the average audio amplitude level without overcutting the record.

A further object of the invention is to provide a volume expanding or compressing means for audio amplifiers having a controllable minimum of time lag in its operation.

Other objects and features of the invention will more fully appear from the following description and will be particularly pointed out in the claims.

The invention may be employed to automatically expand or compress a signal of audio frequency. For purposes of illustration the invention will herein be described in connection with a voice amplifier for use in a conventional radio receiver or for phonograph playback or recording amplifiers.

The apparatus consists of an input lead connected to an amplifier stage employing one or more amplifier tubes the output of which connected to a sound device such as a loud speaker. The input lead is provided with a parallel connection leading to the control grid of another amplifier tube the output of which is connected to the primary of a step up transformer the secondary of which is connected to a rectifier of the crystal or other contact type. The direct current output of the rectifier is applied to at least one of the grids of the first mentioned amplifier. This grid biasing control functions to vary the mutual conductance of the amplifier tubes in a manner which increases the amplitude of strong signals more than that of weaker signals when it is operated as a signal expander.

By suitable circuit arrangement either the positive or negative terminal of the rectifier may be connected to the grids which act to modify the output signals of the apparatus. In this manner the latitude of signal amplitude may selectively be either expanded or compressed.

To provide a better understanding of the invention a particular embodiment thereof will be described and illustrated herein in which the drawing is a diagram presenting a preferred form of the invention.

The input lead 1 is adapted for connection to the output of a device for creating a signal of audio frequency such as the detector stage of a radio receiver, a microphone or a phonograph pick up device. These signal generating devices are not shown because they form no part of the invention.

The input lead 1 is divided into two sections 2 and 3. The section 2 is coupled to the control grid 4 of a thermionic tube 5 through a condenser 6. The tube is supplied with power from a source of supply 8.

The tube 5 is connected as a phase inverter with its load impedance split equally between its plate and cathode circuits. The resistors 7 and 15 serve as load resistors across which the out-of-phase voltages are developed.

The out-of-phase voltages are applied respectively to the secondary control grids 9 and 10 of a pair of pentode, hexode or other multigrid tubes 11 and 12. The tubes 11 and 12 are connected to function as a balanced push pull amplifier stage for driving, directly or after suitable further amplification, a transducer such as a loud speaker or a sound recorder not shown.

Suitable resistors and capacitors are inserted in the circuit to provide proper operating voltages and operating conditions. Static bias for signal grids 9 and 10 is developed across resistance-capacitance unit 14′ forming part of a direct current voltage divider and connected to the cathodes 14, and applied through resistors 9′ and 10′ to the signal grids. An additional resistance-capacitance biasing unit 14″ is in the negative return of unit 14′ to ground, for a purpose to be described. The tubes 11 and 12 are similarly supplied with suitable plate and screen voltages. The tubes 11 and 12 function to deliver equal and out-of-phase voltages across the plate load resistors 16 and 17. Voltage is supplied to the plates 18 through a common plate resistor 19 and the various circuit elements are so balanced that as far as the signal voltage is concerned the junction 20 of the resistors 16, 17 and 19 is substantially at ground potential.

Referring now to the section 3 of the input lead 1 it is connected to the control grid 21 of an amplifier tube 22. The tube 22 is connected in the conventional or any suitable manner to function as an amplifier of the signal impressed upon its grid 21. The output or plate connection of the tube 22 is connected to one terminal of the primary of a step up transformer 23 while its other terminal is connected to a suitable power source. The terminals of the secondary of the transformer are connected to the input terminals of a rectifier unit 24. The unit 24 is composed of a plurality of crystal or other contact type rectifiers 25. Desirably the rectifiers 25 are arranged in a bridge formation to present input terminals 26 and 27 and output terminals 28 and 29. A load resistor 30 of substantially 250,000 ohms is applied to the output terminals 28 and 29. With this arrangement the input impedance of the rectifier is made relatively high and matches efficiently with the impedance of the secondary of the transformer 23. It has been found that if the transformer ratio is 3.5 to 1 a voltage of unity applied to the primary of the transformer 23 will produce a direct current voltage of substantially 3.2 at the output terminals of the rectifier 24.

The direct current output of the rectifier is connected to one of the remote cut-off, variable-mu grids of the tubes 11 and 12 such as the grids 31 thereof nearest to the cathodes 14. The grids 31 are connected to each other to operate in parallel in contrast to grids 9 and 10 which operate in push pull. The rectifier output is fed to the grids 31 through a filter resistor 33. In the above manner a direct current voltage proportional to the mean signal amplitude is applied to the grids 31.

The filter resistor 33 plus other elements to be described prevent the gain of the amplifier, controlled by the direct current component, from changing at an audio rate and causes the control voltage to follow sub-audio changes rather than instantaneous changes in input level. It is in the function of this filter system that prior expander circuits have shown lack of efficiency by reason of an objectionable time delay introduced thereby. It will be pointed out hereinafter how the present invention materially reduces such time delay.

As above suggested the apparatus may be employed as a signal expander or compressor. It is desirable therefore that provision be made for readily shifting from one circuit condition to the other. One method of accomplishing this result is to provide a double pole double throw switch 34. The blades of the switch are connected to the output terminals 28 and 29 of the rectifier 24. When the switch blades are thrown to the left as viewed in the drawing, the positive terminal 29 is connected to the grids 31 through resistor 33 and the switch contacts 35. When the switch blades are thrown to the right the negative terminal 28 of the rectifier is connected to the grids 31 through the switch contacts 36 and resistor 33.

The dynamic bias developed across resistor 30 is applied between grids 31 and cathodes 14 in series with potentiometer 38 across biasing unit 14'' which supplies a static bias. Switch contact 35 is connected to potentiometer 38 by lead 37. The portion of the bias of unit 14'' that is used is adjustable by manipulation of potentiometer 38; and in like sense the portion of the dynamic bias that is utilized is controlled by the setting of a slide tap on resistor 30, as shown. Adjustment of elements 30 and 38 is effected in unison by mechanical ganging. Thus when unit 30 is adjusted to furnish the maximum range of developed positive dynamic bias, unit 38 is adjusted for maximum negative bias. It is thus seen that the junction of bias supplies 14' and 14'' is a reference point to which the return circuit of grids 31 is connected and that this return circuit includes the bias developed across the utilized portion of resistor 30 plus the bias developed across the utilized portion of potentiometer 38; and where switch contacts 35 are used these bias voltages are connected in series opposition. Resistance capacitance unit 14' furnishes a static minimum negative bias for the variable-mu grids. Resistor 30 is shunted by a small condenser 39 to make the direct current output of the rectifier approximate the peak of the impressed alternating current voltage and also act as a portion of a filter network including the resistor 33. Connections are so made that when the switch 34 is thrown to the compress position the resistor 38 is cut out of the circuit, lead 37' furnishing a return path for the dynamic bias circuit bypassing unit 14.

When the two resistors 30 and 38 are mechanically ganged together and when such an arrangement is turned to its full off position (top of unit 38, bottom of unit 30) the resting grid bias on the grids 31 is practically equal to that on the grids 9 and 10.

When the ganged control is advanced however, the resting bias voltage is made more negative which causes the stage gain to decrease. Simultaneously the positive modifying voltage is increased and this increases the amplitude of the higher input signal excursions in relation to lower signal excursions thus developing the desired output signal expansion. The reduced gain caused by control 38 is offset for peak signals by the dynamic bias from unit 30. Furthermore the voltage distribution on the resistor 38 and the voltages obtained at corresponding settings on the resistor 30 are such that the operating range or grid swing of the tubes is held within allowable limits. At normal levels of signal applied at the input therefore the tube grids 31 will not swing positive to block operation of the system.

To prevent an extremely strong impulse from overloading the grids thus blocking the system a crystal diode is reverse connected in the lead to the grids 31 to act as a clipper in conjunction with the resistor 33. This operates as a shorting link for positive dynamic bias peaks, shunting them to ground through unit 14'', this unit drawing current through the relatively high output impedance of the dynamic bias supply. The back resistance of the crystal should be as high as possible to prevent an undesirable decrease in the amplitude of the control voltage being impressed upon the grids.

When the circuit is used as a signal compressor the control voltage is reversed in polarity to cause the grids 31 to swing in the negative direction. Under these conditions the resting bias of the grids 31 is kept at the same value as that of the signal grids 10 and is constant at all settings of the automatic gain control means because the resistor 38 is not in the circuit when the switch 34 is in the compress position.

The variable resistor 41 and the condenser 42 are connected in series from grids 31 to ground, to serve further in the filtering action of resistor 33 against sudden decay of gain-control bias. The period of time it takes for the charge on condenser 42 to decay to a reduced value representing reduced input signal level is determined by the setting of resistor 41.

In operation of the circuit described the control voltage applied to the grids 31 is only partially filtered. An appreciable alternating current inverse component is amplified and appears across the common plate load resistor 19. This alternating current component is applied to the grids 31 through a feed back condenser 43 in such a manner that it cancels the alternating current component directly conducted to the grids.

This manner of cancelling the unfiltered unbalanced, parallel-output portion of the modifying voltage is a feature of the invention. By employing the feedback condenser 43 smooth and high quality operation is obtained without significant sacrifice in rapid rise time of the control voltage. If the feedback operation were not employed a filter system having relatively large units would be required to produce the necessary filtering action. Such a filter system would greatly prolong the rise time of the voltage. The present invention provides an efficient filter system which permits the employment of extremely fast rise time of the voltage applied to the grids 31 as above suggested.

Moreover, such construction also coacts efficiently with the relatively low conducting resistance of the crystal rectifier to enhance the rapid action of the circuit. It has been found possible by actual test of the circuit to reduce the rise time of the voltage on the grids to 3 milliseconds.

Suitable screen grid voltage is applied to the screen grids of the tubes 11 and 12 through a resistor 44.

The apparatus functions as follows. An input signal of audio frequency is conducted to the system and split into two channels one of which amplifies the signal without modification while the other channel introduces a control voltage which acts to change the signal in a predetermined manner for instance to expand or compress the amplitude of the input signal.

The function of the first mentioned channel will be described first. The input signal may be amplified in this portion of the apparatus in any desired manner. As presented herein however the tube 5 is arranged to function as a phase inverter having its plate and cathode coupled to the main control grids of the push pull tubes 11, 12. The output of the tubes 11 and 12 is used to drive a sound device such as a loudspeaker.

Referring now to the other channel to which the input signal flows, the signal is first fed to the tube 22 and then through the step up transformer 23. The output of the transformer is fed to the input of the rectifier 24. The direct current control voltage derived from the rectifier is conducted to and serves to vary the mutual conductance of the tubes 11 and 12.

This change in mutual conductance may be effected in any suitable manner. As herein presented the control voltage is applied to the grids 31 of the tubes. By so connecting the grids 31 the grids 9 and 10 are free to exercise their natural sharp cutoff characteristic and to handle a relatively large range of input signal voltages without distortion.

Moreover the remote cutoff grids 31 are more suitable for application of relatively large negative control voltages as when used as a compressor, since there is less tendency to cut off plate current when controls 30 and 38 are set for maximum operation.

The resistors 30, 33 and the condenser 39 constitute a filter network in the leads to the control grids 31 and act to cause the direct current control voltage to follow the average level of the signal and not the normal audio rate of the signal.

In the operation of expander circuits prior to the present invention undesirable time lag has been introduced by the filter network through which the control voltage must pass. The present invention reduces the time lag occasioned by the filter to a negligible degree which permits the direct current control voltage to respond practically instantly and thereby to follow the modulations of the input signal without a distorting time lag.

A feature of the invention lies in the development of that part of the apparatus which produces the direct current controlling voltage and which overcomes the undesirable time lag heretofore existing. A portion of the input signal is amplified by the tube 22. The signal is then passed through the step up transformer 23 the output of which is impressed upon the input of the crystal bridge rectifier. An advantage is gained from the fact that the rectifier has a relatively high impedance input which may be efficiently matched to the secondary of the high gain transformer. Thus a substantial overall gain is achieved. A further advantage of the use of the crystal type rectifier lies in the fact that its output conducting resistance is much lower than an equivalent vacuum tube circuit. The charging time of the filter condenser 39 is thus greatly reduced thus increasing the speed of action of the rise time of the control voltage. This gain in speed together with the reduction of time lag obtained through the feed back action of the condenser 43 insures that the control voltage will act sufficiently instantaneously to avoid all signal amplitude or frequency distortion.

A very much improved rise time in the control voltage is obtained by the invention while provision is also obtained for manual regulation of the decay time of the control voltage.

What I claim is:

1. An audio signal amplifying and modifying apparatus having two signal channels and comprising signal amplifying means having at least one amplifier tube in a first signal channel, the other signal channel containing an amplifier stage, a rectifier connected to the output of said amplifier stage, means connecting the direct current output of said rectifier to a grid in the tube in said first amplifier, a source of substantially fixed bias potential, and a rectifier connected between said grid and said fixed potential source and polarized properly to limit positive rise of grid potential.

2. An amplifier having variable amplitude-response characteristics, said amplifier comprising a tube having a variable-mu grid and an input circuit, means including a rectifier for developing dynamic bias, common signal supply connections to said dynamic bias means and to said input circuit, and a static bias means, said tube having gain-control means including said static bias means and said dynamic bias means coupled in series-opposition to said grid, one of said bias means thereby providing positive grid bias and the other providing negative grid bias, and a diode between said variable-mu grid and said static bias source polarized so as to be substantially conductive only when the positive bias tends to exceed the negative bias.

3. An amplifier having variable amplitude-response characteristics, said amplifier comprising signal supply means, a tube coupled to said means and having a variable-mu grid, means coupled to said supply means and including a rectifier connected to said grid for applying positive dynamic bias, static negative bias means connected to said dynamic bias means in series-opposition, and a diode connected between the extremities of said series-opposition bias means and polarized so as to be substantially conductive only when the dynamic bias tends to become more positive than said static negative means.

4. A variable response amplifier in accordance with claim 3 including an additional source of static bias establishing a minimum negative operating level for said grid.

ROBERT C. MOSES.

REFERENCES CITED

The following references are of record in the file of this patent:

UNITED STATES PATENTS

| Number | Name | Date |
|---|---|---|
| 1,998,619 | Hammond, Jr. | Apr. 23, 1935 |
| 2,052,110 | Pfister | Aug. 25, 1936 |
| 2,186,195 | Dalpayrat | Jan. 9, 1940 |
| 2,247,468 | Barr et al. | July 1, 1941 |
| 2,258,762 | Hickok | Oct. 14, 1941 |
| 2,315,042 | Boucke | Mar. 30, 1943 |
| 2,357,696 | Singer | Sept. 6, 1944 |
| 2,361,198 | Harmon et al. | Oct. 24, 1944 |
| 2,363,813 | Somers | Nov. 28, 1944 |